United States Patent
Saito

(10) Patent No.: US 7,023,630 B2
(45) Date of Patent: Apr. 4, 2006

(54) OPTICAL ELEMENT HAVING MINUTE PERIODIC STRUCTURE

(75) Inventor: Hiroshi Saito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 10/913,332

(22) Filed: Aug. 9, 2004

(65) Prior Publication Data

US 2005/0036212 A1     Feb. 17, 2005

(30) Foreign Application Priority Data

Aug. 13, 2003   (JP)   .............................. 2003-293150

(51) Int. Cl.
   *G02B 7/02*  (2006.01)
(52) U.S. Cl. ...................... 359/820; 359/563
(58) Field of Classification Search ................ 359/512, 359/563, 569, 570, 574–576, 820

See application file for complete search history.

(56) References Cited

U.S. PATENT DOCUMENTS

| | | | |
|---|---|---|---|
| 5,694,247 A | 12/1997 | Ophey et al. | 359/566 |
| 5,726,805 A | 3/1998 | Kaushik et al. | 359/589 |
| 5,978,159 A * | 11/1999 | Kamo | 359/793 |
| 6,348,999 B1 * | 2/2002 | Summersgill et al. | 359/569 |
| 2002/0118465 A1 | 8/2002 | Hosoe | 359/642 |
| 2002/0179827 A1 | 12/2002 | Kimura | 250/234 |
| 2002/0191286 A1 | 12/2002 | Gale et al. | 359/486 |

FOREIGN PATENT DOCUMENTS

| | | |
|---|---|---|
| EP | 1 241 490 A2 | 9/2002 |
| EP | 1 260 847 A2 | 11/2002 |
| EP | 1 260 847 A2 | 12/2002 |
| JP | 2001-183506 | 7/2001 |

OTHER PUBLICATIONS

M.T. Gale et al., "Replication Techniques for Diffractive Optical Elements," 34 *Microelectronic Engineering* 321-39 (1997).

A. Gombert et al., "Antireflective Submicrometer Surface-Relief Gratings for Solar Applications," 54(1-4) *Solar Energy Materials and Solar Cells* 333-42 (1998).

Eric B. Grann et al., "Artificial Uniaxial and Biaxial Dielectrics with Use of Two-Dimensional Subwavelength Binary Gratings," 11(10) *J. Opt. Soc. Am. A.* 2695-2703 (Oct. 1994).

* cited by examiner

*Primary Examiner*—Hung Xuan Dong
*Assistant Examiner*—Joseph Martinez
(74) *Attorney, Agent, or Firm*—Fitzpatrick, Cella, Harper & Scinto

(57) ABSTRACT

An optical element is disclosed which is resistant to changes in environmental characteristics such as temperature and humidity and achieves a stable and favorable reflection suppressing effect. The optical element has a base member and a resin layer which is formed on the base member and has a linear expansion coefficient different from that of the base member. The resin layer has a minute periodic structure which has a period smaller than the wavelength of incident light on the optical element.

10 Claims, 8 Drawing Sheets

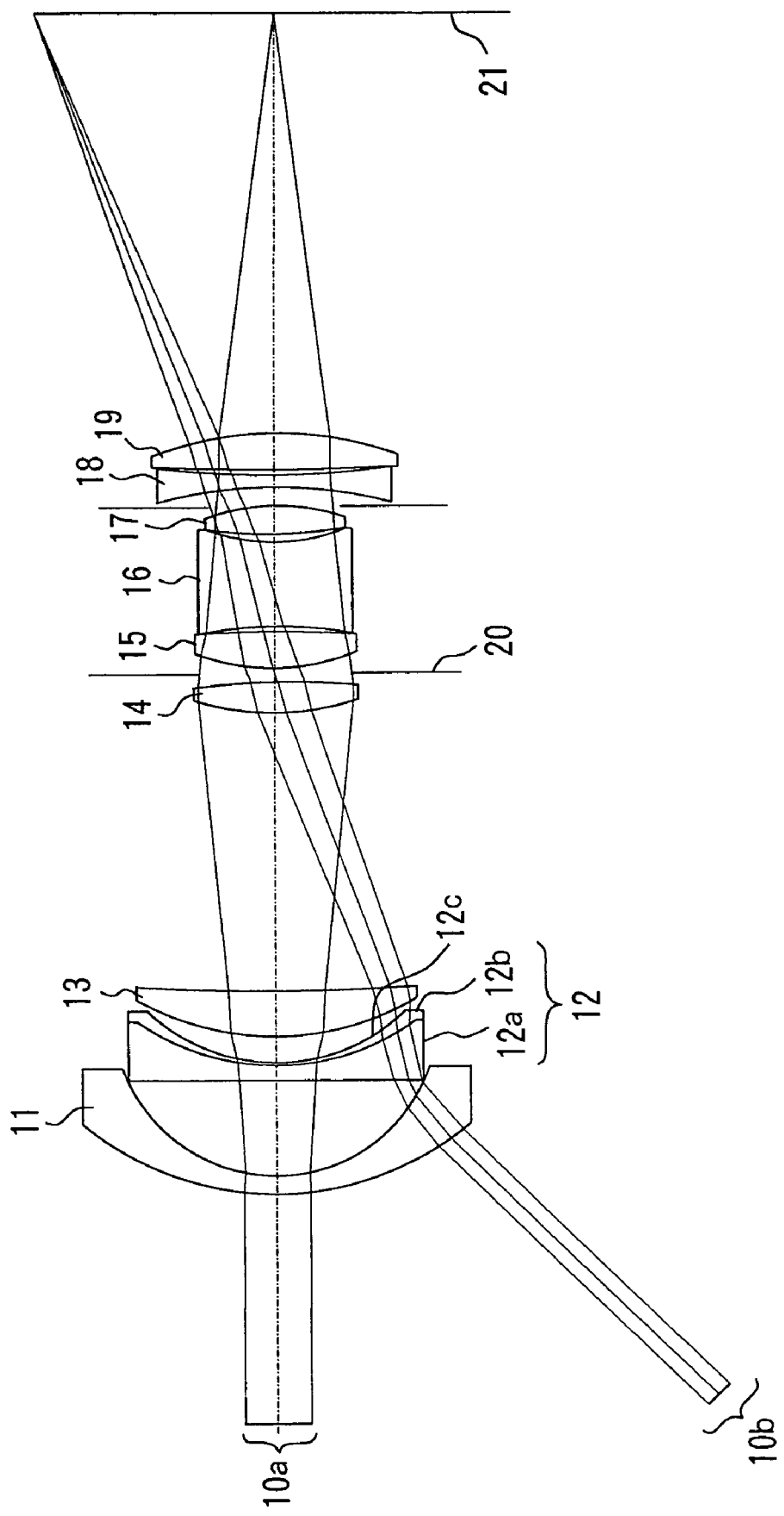

OPTICAL ELEMENT HAVING MINUTE PERIODIC STRUCTURE

BACKGROUND OF THE INVENTION

1. Field of the Invention

The present invention relates to an optical element having a minute periodic structure.

2. Description of the Related Art

Spherical lenses or aspheric lenses are used in an image-taking optical system of an image-taking apparatus such as a video camera and a digital still camera and in a projection optical system of a liquid crystal projector or the like.

Manufacturing methods of the aspheric lenses include a glass grinding method, a glass molding method, a plastic molding method, a replica method (a molding and transfer method).

Aspheric lenses manufactured through the glass grinding are significantly expensive since each machining takes a long time, although high flexibility is provided in optical design with few limitations on types and sizes of glass materials of the lenses.

Aspheric lenses formed through the glass molding are relatively inexpensive since they can be manufactured with molds, but only limited types of glass materials can be used.

Aspheric lenses formed with the plastic molding can be manufactured extremely inexpensively through injection molding, although optical plastic materials are limited in number and have relatively low refractive indexes.

In aspheric lenses manufactured with the replica method, a resin layer having an aspherical surface is formed on a spherical glass lens serving as a base member. Thus, types and sizes of glass materials of the base lens are not strictly limited similarly to the aspheric lenses formed through grinding. In addition, the resin layer having an aspherical surface is relatively inexpensive since it can be manufactured with molding.

In the replica aspheric lenses, a reflection suppressing coat is typically required on the aspherical surface of the resin in order to reduce ghost and flare caused by reflection on the lens surface in view of the structure in which the aspheric resin layer is formed on the glass lens.

The replica resin material has a low refractive index and needs high adhesion since it not resistant to significantly increased temperature during the formation of the coat, so that the reflection suppressing coat is typically formed as a multi-layered structure.

On the other hand, to provide a reflection suppressing function, Japanese Patent Application Laid-Open No. 2001-183506 or the like has disclosed an optical element in which a minute periodic (grating) structure having a period (a grating pitch) smaller than the wavelength of incident light is formed on a base member.

When the environmental temperature for the replica lens is changed, however, a large difference between the linear expansion coefficient of the base glass and the linear expansion coefficient of the resin results in large stress at the interface between the glass and the resin layer. In addition, since the linear expansion coefficient of the material of the reflection suppressing coat formed on the resin layer is also different from the linear expansion coefficient of the resin layer, stress is also produced at the interface between them.

Especially when the glass lens has a spherical surface and the resin layer has an aspherical surface, the resin layer has a nonuniform thickness and it varies greatly. If the environmental temperature is changed, complicated and large stress is produced at the surface (the aspherical surface) of the resin since the linear expansion coefficient of the resin is considerably larger than the linear expansion coefficient of the glass and the surface of the resin layer closer to the glass lens is fixed to the glass lens, thereby causing the problem that the reflection suppressing coat comes off or a crack occurs.

In general, the replica resin layer has a water absorbing property which causes the resin layer to be swelled when the environmental humidity is changed. In this case, similar to the case where the environmental temperature is changed, large stress is produced if the resin layer has an aspherical surface, and the same problem as described above is presented.

When the replica method is used to manufacture an aspherical surface having a small approximate radius of curvature R, the nonuniform thickness of the lens hardly affects the manufacturing and thus the aspherical surface can be formed relatively easily.

However, when the reflection suppressing coat is formed with a vacuum deposition method on a lens having a small approximate radius of curvature (which is the radius of curvature of a circle defined by the center of an aspherical surface and a point including an effective maximum peripheral portion), the thickness of the coat at the center of the lens is different from that in a peripheral portion to prevent realization of desired characteristics. Particularly, the replica lens typically has a multi-layered reflection suppressing film as described above, so that the reflection suppressing property at the center is greatly different from that in the peripheral portion.

SUMMARY OF THE INVENTION

It is a subject of the present invention to provide an optical element which is resistant to changes in environmental characteristics such as temperature and humidity and achieves a stable and favorable reflection suppressing effect.

According to one aspect, the present invention provides an optical element comprising a base member and a resin layer which is formed on the base member and has a linear expansion coefficient different from that of the base member. The resin layer has a minute periodic structure which has a period smaller than a wavelength of incident light on the optical element.

These and other characteristics of the optical element of the present invention, an optical system using the same, and an optical apparatus using the same will be apparent from the following description of specific embodiments with reference to the drawings.

BRIEF DESCRIPTION OF THE DRAWINGS

FIG. 2 shows the structure of an image-taking optical system which is Embodiment 2 of the present invention;

DETAILED DESCRIPTION OF THE PREFERRED EMBODIMENTS

Embodiments of the present invention are hereinafter described with reference to the drawings.

(Embodiment 1)

Figure 1A:
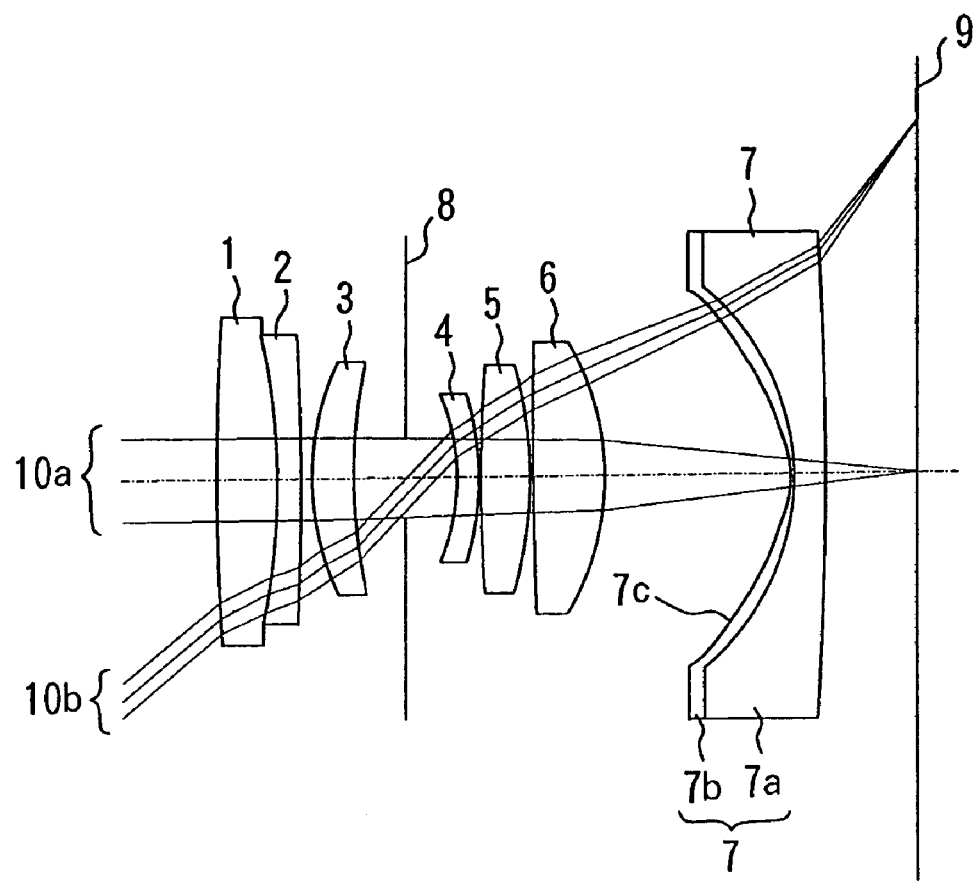
FIG. 1A shows the structure of an image-taking optical system which is Embodiment 1 of the present invention.
Figure 1B:
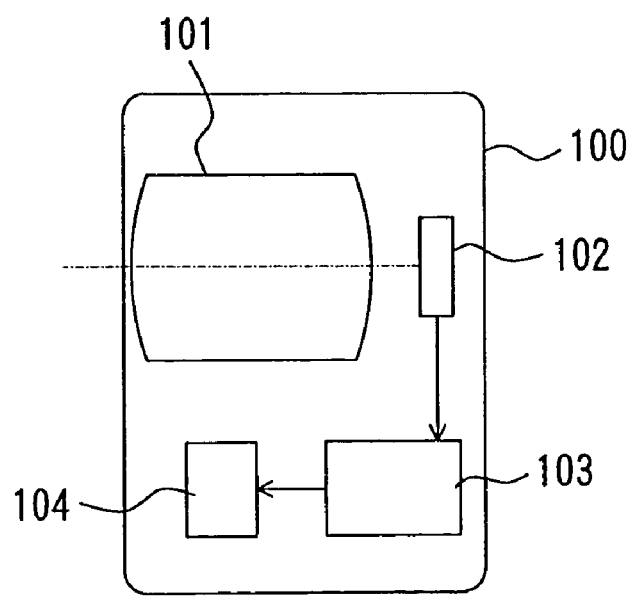
FIG. 1B shows the structure of an image-taking apparatus which has the image-taking optical system of Embodiment 1.

FIG. 1A shows an image-taking optical system which is Embodiment 1 of the present invention. FIG. 1B shows the structure of an image-taking apparatus such as a digital camera and a video camera which uses the image-taking optical system.

In FIG. 1B, reference numeral 100 shows a body of the image-taking apparatus, and 101 the image-taking optical system. Reference numeral 102 shows an image-pickup element formed of a CCD sensor, a CMOS sensor or the like disposed on an image plane of the image-taking optical system 101. The image-pickup element 102 photoelectrically converts a subject image formed by the image-taking optical system 101. An output signal from the image-pickup element 102 is amplified and A/D converted by an image processing circuit 103 before predetermined processing thereby. In this manner, an image signal is produced. The image signal is recorded on a recording medium 104 such as a semiconductor memory, an optical disc, and a magnetic tape.

In FIG. 1A, reference numerals 1 to 7 show lenses constituting the image-taking optical system. Reference numeral 8 shows a stop, and 9 an image plane (the position of an image-pickup device or a film).

Reference numeral 10a shows a luminous flux (a central luminous flux) which is formed into an image at the center of the image plane 9, while reference numeral 10b shows a luminous flux (a peripheral luminous flux) which is formed into an image in a peripheral portion of the image plane 9.

Of the lenses 1 to 7, the lens 6 has an aspherical surface on the image plane side and is formed with the glass molding method or the plastic molding method.

The lens 7 has an aspherical surface on the subject side. The lens 7 is an aspheric lens formed of a glass lens (a base member) 7a which has spherical surfaces on both sides and a relatively thin resin layer 7b which is formed with the replica method on the spherical surface on the subject side of the glass lens 7a and has an aspherical surface 7c on the subject side. The lens 7 is a so-called replica aspheric lens. The resin layer 7b is formed, for example, of an ultraviolet curing resin and has a linear expansion coefficient different from that of the glass lens 7a. This also applies to other embodiments.

Figure 3:
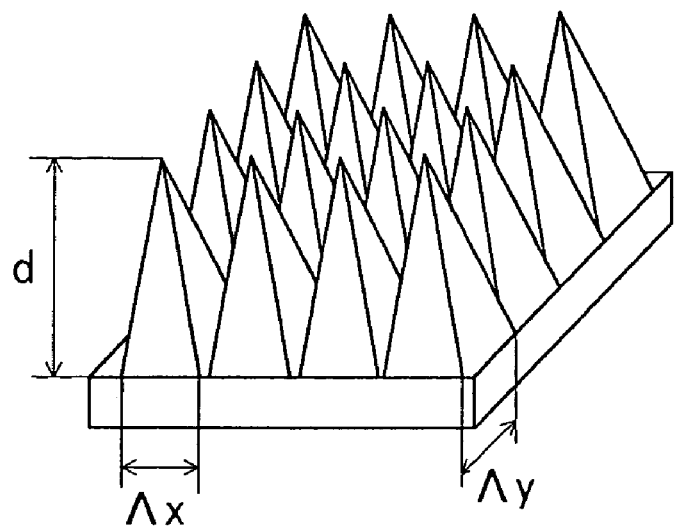
FIG. 3 shows three-dimensionally dimensions and shape of a minute grating structure used in each of Embodiments 1 to 3.
Figure 4:
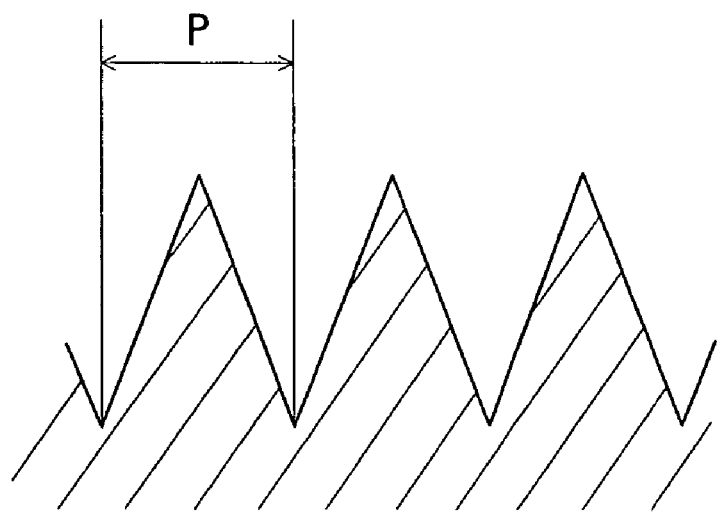
FIG. 4 shows a sectional shape of the minute grating structure used in Embodiments 1 and 3 of the present invention.

On the aspherical surface (the surface) 7c of the resin layer 7b, a minute grating structure (a minute periodic structure) is formed integrally with the aspherical surface. The minute grating structure has the sectional profile of triangles (triangular pyramids) as shown in FIG. 4 arranged to be periodic two-dimensionally as shown in FIG. 3 in a period smaller than a wavelength for use (a design wavelength of light incident on the lens, for example a wavelength in a visible light region). The minute grating structure formed to be periodic two-dimensionally in this manner can provide a reflection suppressing property with small transmission variations in a vibration direction of light.

The minute grating structure is formed simultaneously with the formation of the aspherical surface by forming the shape for providing the minute grating structure on a mold for transferring the replica aspherical surface. This can realize the stable aspheric shape and minute grating structure to provide the aspherical surface with the reflection suppressing function by the minute grating structure. In addition, the method can reduce the cost of the replica aspheric lens.

Next, description is made for the principles of reflection suppression provided by such a minute grating structure. In the minute grating structure having the period smaller than the wavelength of incident light, a grating pitch P which satisfies conditions as a so-called 0th-order grating is selected.

The minute grating structure is called an SWS (subwave structure) which has a grating pitch smaller than a typical diffraction grating by one or two orders of magnitude and is intended for use of 0th-order light with no diffraction.

The 0th-order grating is a grating which does not produce diffracted light except 0th-order light in a periodic minute grating structure (see "Optical Society of America Vol.11, No10/October 1994/J.Opt.Soc.Am.A p2695).

In general, in the minute grating structure having periodicity, diffracted light is produced at a diffraction angle which satisfies the condition for diffraction:

$$P(ns\cdot\sin\theta m - ni\cdot\sin\theta i) = m\lambda \quad (1)$$

where P represents a grating pitch, ni a refractive index of a medium of the grating structure on the incident side, $\theta i$ an incident angle, $\theta m$ a diffraction angle of mth, ns a refractive index of a medium of the grating structure on the exit side, m an order of diffraction, and $\lambda$ a used wavelength.

As apparent from the condition (1), the diffraction angle $\theta m$ is represented by:

$$\theta m \geq \theta 1 (m=1)$$

The abovementioned document "Optical Society of America" shows that, as a condition for preventing occurrence of +1st-order diffracted light, the following holds for vertical incidence:

$$\theta_{+1} \geq 90° \quad (2)$$

so that the following condition is satisfied for the 0th-order grating:

$$P < \lambda/(ns + ni\cdot\sin\theta i) \quad (3)$$

For an incident light farthest from the axis, the value of $\theta_{+1}$ is 90 degrees or more, and the grating pitch P is smaller. When the incident angle is other than 0 degree, the grating pitch P needs to be further reduced.

When the approximate radius of curvature of the aspheric resin layer is represented by R, and the angle between maximum effective portions (effective maximum peripheral portions) of the aspheric lens which is viewed from the center of radius of curvature R is represented by $\theta$, the following condition is satisfied preferably:

$$20° < \theta < 90° \quad (4)$$

where the approximate radius of curvature refers to the radius of curvature of a circle defined by the center of the aspherical surface and a point including the effective maximum peripheral portion.

If the lower limit of the condition (4) is not reached, it is difficult to effectively correct distortion aberration or the like in the aspherical surface over a wide range of field angles. On the other hand, if the upper limit is exceeded, it is difficult to form a minute grating structure with respect to the normal to the surface with the replica method, and lower shape accuracy significantly reduces the reflection suppressing effect.

The minute grating structure may be formed such that the structural parameters (such as the shape and dimensions) of the elements of the grating are continuously or step by step changed from the center toward the periphery of the lens.

As described above, when the incident angle of light rays on the surface varies, the pitch and shape in the grating also vary for providing the optimal reflection suppressing property. Thus, the grating conditions (the structural parameters) may be preferably changed in accordance with the desired reflection suppressing property from the center to the periphery. Especially, in the aspherical surface, the light incident angle varies irregularly with respect to the normal to the surface from the center to the periphery of the lens, so that the optimal grating conditions can be set in accordance with that variation to provide the optimal reflection suppressing effect.

In addition, at least one of the following conditions is satisfied preferably:

$$0.01 < |nd1 - nd2| < 0.5 \quad (5)$$

$$0.5 < |vd1 - vd2| < 40 \quad (6)$$

where nd1 and nd2 represent the refractive indexes of the resin layer and the base member for a d-line, and vd1 and vd2 represent the Abbe numbers thereof.

If the lower limit of the condition (5) is not reached, a smaller difference in the refractive index at the cemented surface between the replica resin layer and the base material (glass in Embodiment 1) makes it difficult to effectively correct spherical aberration and chromatic aberration of the optical system in the curvature at the cemented surface. On the other hand, if the upper limit is exceeded, the surface reflection at the interface between the replica resin layer and the base material is extremely increased to cause more visible ghost, thereby reducing performance.

On the other hand, if the lower limit of the condition (6) is not reached, correction effects can hardly be provided for axial chromatic aberration or chromatic aberration of magnification at the cemented surface between the replica resin layer and the base material. If the upper limit is exceeded, the amount of spherical aberration for color produced in the aspheric lens is extremely increased to cause difficulty in correction.

In addition, the period (the grating pitch) P of the minute grating structure preferably satisfies the following condition:

$$100 \text{ nm} < P < 350 \text{ nm} \quad (7)$$

The condition is provided for achieving the reflection suppressing effect in the wavelength region of visible light (approximately 400 to 700 nm) used in the image-taking optical system. If the lower limit is not reached, the difficulty in manufacturing the grating shape is extremely great to increase scattered light due to manufacturing errors. On the other hand, if the upper limit is exceeded, diffracted light is produced in a shorter wavelength region of visible light and becomes flare components to have adverse effects on image performance.

Figure 6:
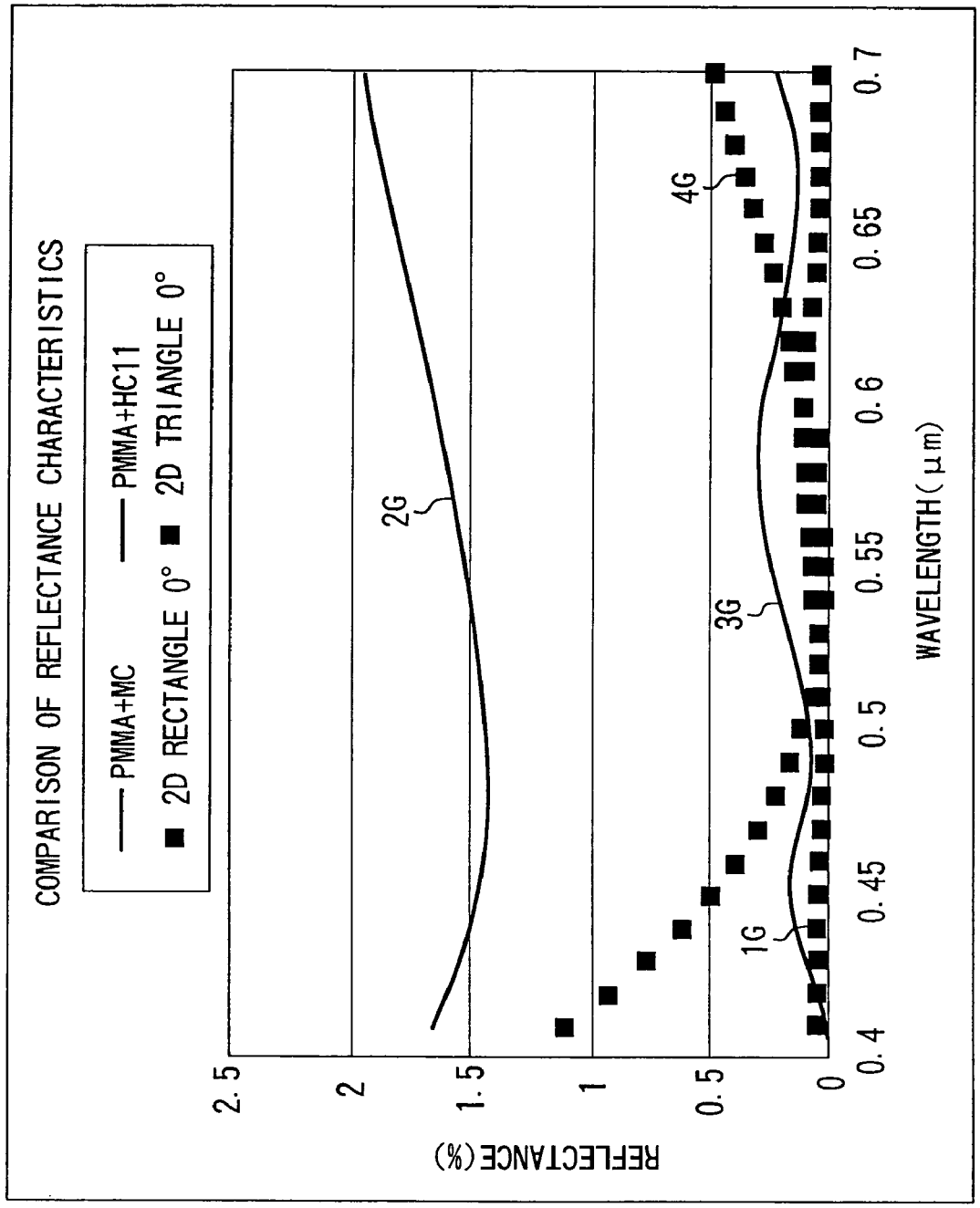
FIG. 6 is a graph showing reflection characteristics on a replica aspherical surface (at an incident angle of 0°) of Embodiments 1 and 2.

In FIG. 6, a broken line 1G shows a reflection characteristic for a central ray (at an incident angle of 0°) on the replica aspherical surface in Embodiment 1 similar to that described in "Optical Society of America" as mentioned above. In addition, as reflection characteristics on a vapor deposition thin film for reference, a slid-line 2G shows a reflection characteristic of a single-layered coat (MC) formed on a PMMA (Polymethylmethacrylate) substrate, and a solid-line 3G shows a reflection characteristic of a multi-layered coat (HC11) formed on the PMMA substrate.

Figure 7:
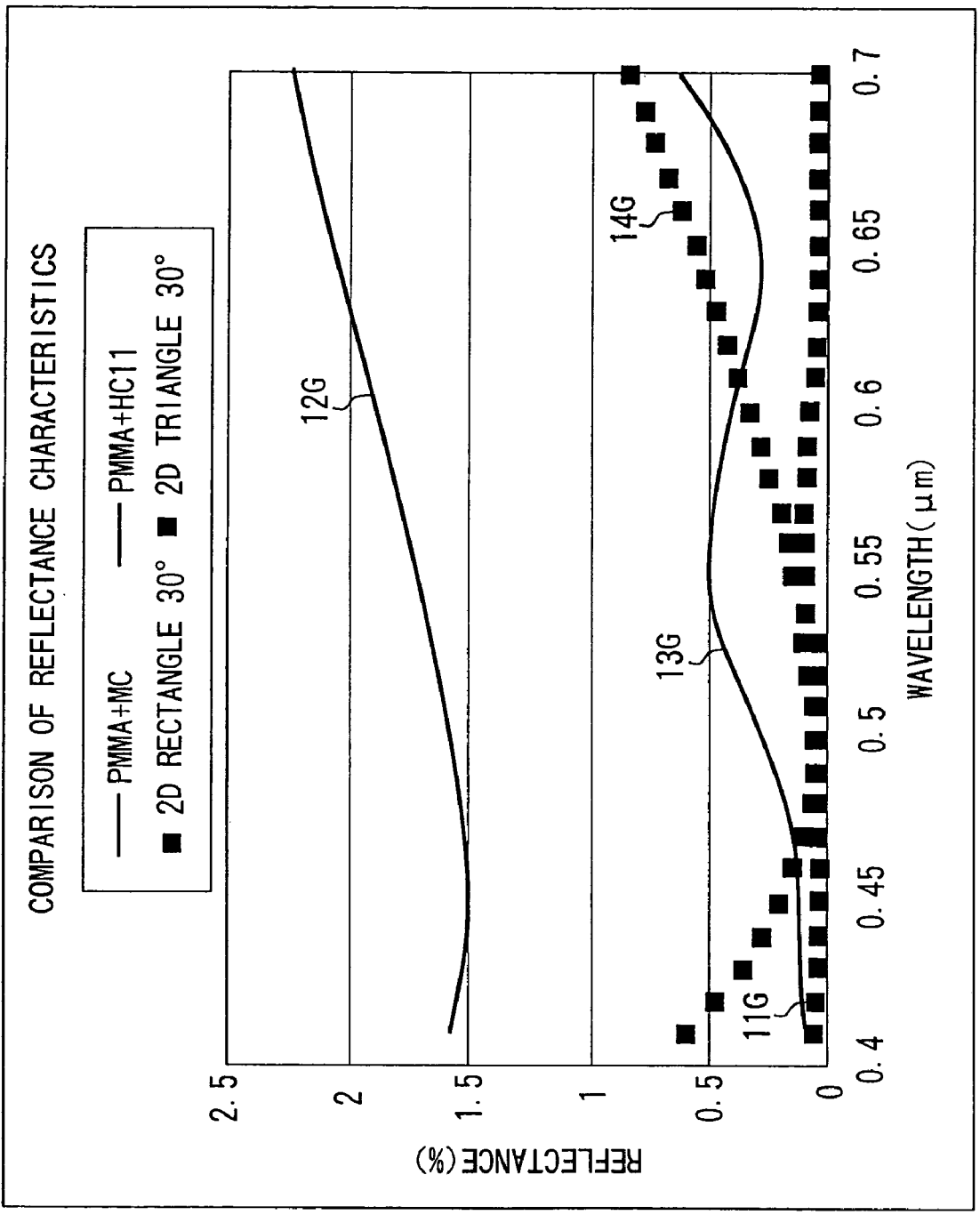
FIG. 7 is a graph showing reflection characteristics on the replica aspherical surface (at an incident angle of 30°) of Embodiments 1 and 2.

In FIG. 7, a broken line 11G shows a reflection characteristic for a peripheral ray (at an incident angle of 30°) on the replica aspherical surface. For reference, as reflection characteristics on the vapor deposition thin film, a solid-line 12G shows a reflection characteristic of a single-layered coat, and a solid-line 13G shows a reflection characteristic of a multi-layered coat.

As apparent from the two graphs, the reflectance is low in the wavelength region of visible light on the replica aspherical surface, and specifically, it is significantly lower than that of the single-layered coat, and lower than that of the multi-layered coat in wavelengths of approximately 0.5 μm to 0.62 μm, with an extremely favorable transmission characteristic.

Numerical Example of the replica aspheric lens 7 of Embodiment 1 is shown below.

Grating Dimensions (the meaning of the dimensions is shown in FIG. 3. The two-dimensional shape is shown in FIG. 4.)

$$d = 0.60 \text{ μm}, \Delta x = 0.20 \text{ μm}, \Delta y = 0.20 \text{ μm}$$

Replica Aspheric Lens 7
    radius of central nd vd effective
    curvature thickness diameter
r1 *aspherical surface 0.05 1.524210 51.39 17.0
r2 −11.905 1.50 1.80400 46.58 17.1
r3 −119.861 22.1
    Aspheric Coefficient (r1)
R=−7.82189
k=−1.0033
B=1.39577E-4
C=2.78432E-6
D=−4.68159E-8
E=2.23446E-10
F=0

The aspherical surface is defined by the following relational condition:

$$x = \frac{h^2/R}{1 + \sqrt{\{1-(1+k)(h/R)^2\}}} + Bh^4 + Ch^6 + Dh^8 + Eh^{10} + Fh^{12} \text{ where } h = \sqrt{(Y^2+Z^2)}.$$

R=−11.68
θ=72.1°
|nd1−nd2|=0.27979
|vd1−vd2|=4.81
P=200 nm (Embodiment 2)

FIG. 2 shows an image-taking optical system which is Embodiment 2 of the present invention. The image-taking optical system is also used in the image-taking apparatus shown in FIG. 1B. In FIG. 2, reference numerals 11 to 19 show lenses constituting the image-taking optical system, 20 a stop, and 21 an image plane.

Reference numeral 10a shows a luminous flux (a central luminous flux) which is formed into an image at the center of the image plane 21, while reference numeral 10b shows a luminous flux (a peripheral luminous flux) which is formed into an image in a peripheral portion.

Of the lenses 11 to 19, the lens 12 is an aspheric lens having an aspherical surface on the image forming side. The lens 12 is a replica aspherical surface formed of a glass lens (a base member) 12a which has spherical surfaces on both sides and a relatively thin resin layer 12b which is formed with the replica method on the spherical surface on the image plane side of the glass lens 12a and has an aspherical surface 12c on the image plane side. The resin layer 12b is formed, for example, of an ultraviolet curing resin.

Figure 5:
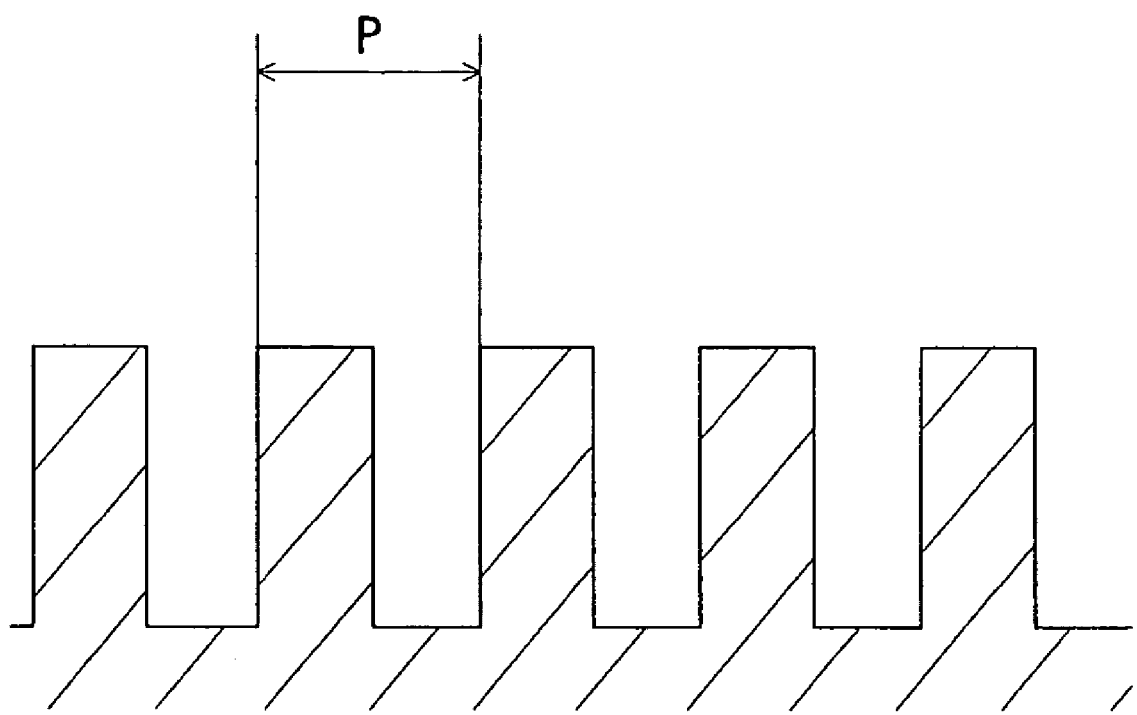
FIG. 5 shows a sectional shape of the minute grating structure used in Embodiment 2 of the present invention.

On the aspherical surface (the surface) 12c of the resin layer 12b, a minute grating structure is formed integrally with the aspherical surface. The minute grating structure has the prism shape (the sectional profile of rectangles) arranged to be periodic two-dimensionally as shown in FIG. 5 in a period smaller than a wavelength of incident light (a wavelength for use). The minute grating structure formed to be periodic two-dimensionally in this manner can provide a reflection suppressing property with small transmission variations in a vibration direction of light.

In Embodiment 2, the conditions (4) to (7) are preferably satisfied similarly to Embodiment 1.

In FIG. 6, a broken line 4G shows a reflection characteristic for a central ray (at an incident angle of 0°) on the replica aspherical surface in Embodiment 2. In FIG. 7, a broken line 14G shows a reflection characteristic for a peripheral ray (at an incident angle of 30°) on the replica aspherical surface.

As apparent from the two graphs, the reflection characteristic is low in the wavelength region of visible light on the replica aspherical surface, and specifically, it is significantly lower than that of the single-layered coat, and lower than that of the multi-layered coat in wavelengths of approximately 0.47 μm to 0.60 μm, with an extremely favorable transmission characteristic.

Numerical Example of the replica aspheric lens 12 of Embodiment 2 is shown below.

Grating Dimensions (the meaning of the dimensions is shown in FIG. 3. The two-dimensional shape is shown in FIG. 5.)

$d$=0.60 μm, $\Lambda x$=0.30 μm, $\Lambda y$=0.30 μm

Replica Aspheric Lens 12
 radius of central nd vd effective
 curvature thickness diameter
 r1 −3023.7 1.20 1.72000 50.22 26.1
 r2 21.524 0.05 1.51282 50.86 24.1
 r3 *aspherical surface 24.1
  Aspheric Coefficient (r3)
 R=18.0535
 k=0.0
 B=−2.73895E-5
 C=−1.19381E-7
 D=3.62895E-10
 E=−1.91189E-12
 F=0
 R=21.45
 θ=58.7°
 |nd1−nd2|=0.20718
 |vd1−vd2|=0.64
 P=300 nm (Embodiment 3)

Figure 8:
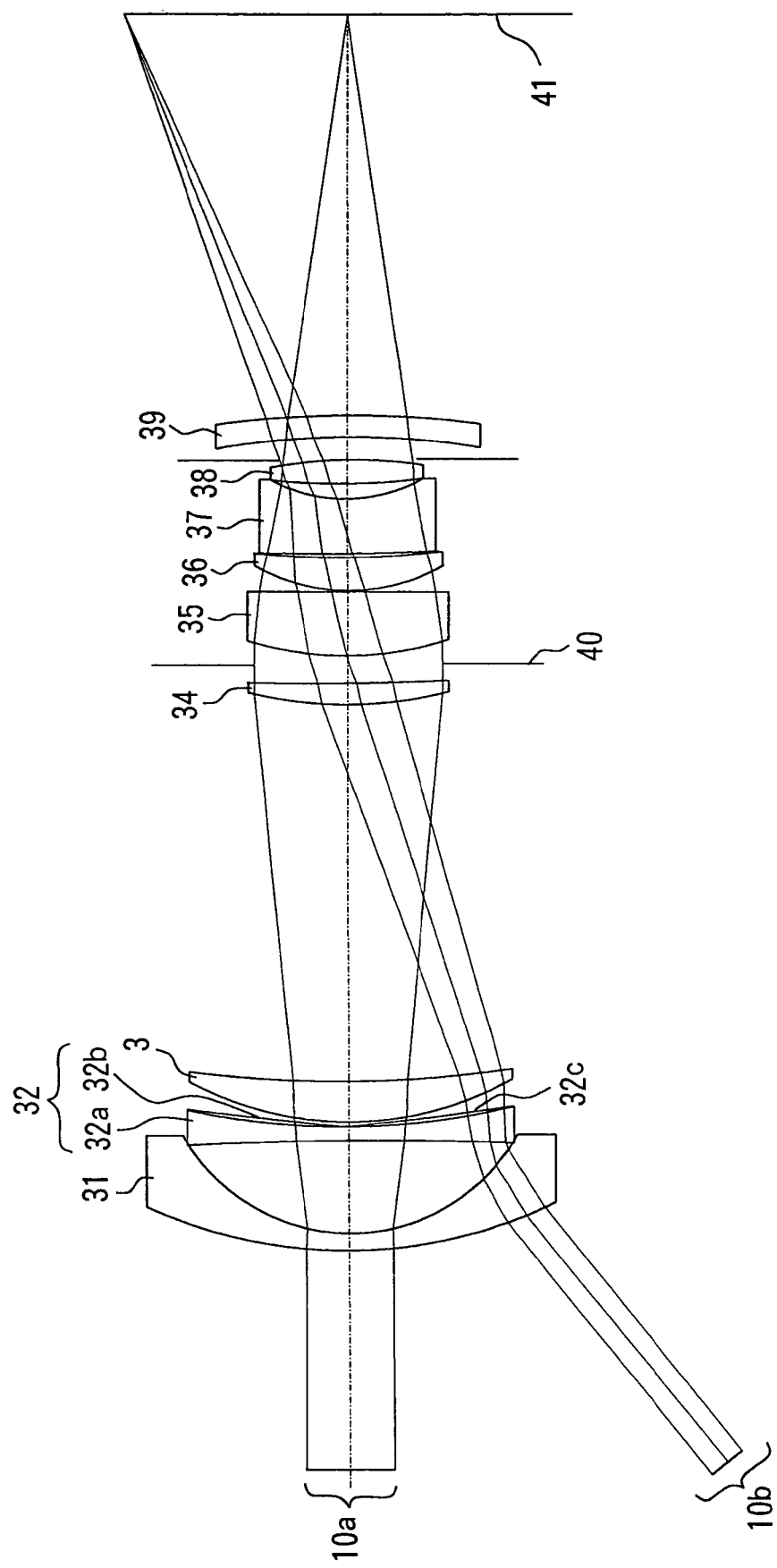
FIG. 8 shows the structure of an image-taking optical system which is Embodiment 3 of the present invention.

FIG. 8 shows an image-taking optical system which is Embodiment 3 of the present invention. The image-taking optical system is also used in the image-taking apparatus shown in FIG. 1B. In FIG. 8, reference numerals 31 to 39 show lenses constituting the image-taking optical system, 40 a stop, and 41 an image plane.

Reference numeral 10a shows a luminous flux (a central luminous flux) which is formed into an image at the center of the image plane 41, while reference numeral 10b shows a luminous flux (a peripheral luminous flux) which is formed into an image in a peripheral portion.

Of the lenses 31 to 39, the lens 32 is an aspheric lens having an aspherical surface on the image plane side. The lens 32 is a so-called replica aspherical surface formed of a glass lens (a base member) 32a which has spherical surfaces on both sides and a relatively thin resin layer 32b which is formed with the replica method on the spherical surface on the image plane side of the glass lens 32a and has an aspherical surface 32c on the image plane side. The resin layer 32b is formed, for example, of an ultraviolet curing resin.

On the aspherical surface (the surface) 32c of the resin layer 32b, a minute grating structure is formed integrally with the aspherical surface. The minute grating structure has the triangular pyramid shape (the sectional profile of triangles) as shown in FIG. 4 arranged to be periodic two-dimensionally as shown in FIG. 3 in a period smaller than a wavelength of incident light (a wavelength for use). The minute grating structure formed to be periodic two-dimensionally in this manner can provide a reflection suppressing property with small transmission variations in a vibration direction of light.

In Embodiment 3, the conditions (4) to (7) are preferably satisfied similarly to Embodiment 1.

Numerical Example of the replica aspheric lens 32 of Embodiment 3 is shown below.

Grating Dimensions (the meaning of the dimensions is shown in FIG. 3. The two-dimensional shape is shown in FIG. 4.)

$d$=0.60 μm, $\Lambda x$=0.15 μm, $\Lambda y$=0.15 μm

Replica Aspheric Lens 32
 radius of central nd vd effective
 curvature thickness diameter
 r1 −447.52 1.40 1.71300 53.84 30.3
 r2 71.382 0.05 1.52421 51.39 29.9
 r3 *aspherical surface 29.7
  Aspheric Coefficient (r3)
 R=56.149
 k=0.0
 B=−4.30753E-6
 C=−4.3033E-10
 D=−1.17078E-10
 E=4.32811E-13
 F=−1.22682E-15
 R=70.01
 θ=24.0°
 |nd1−nd2|=0.18879
 |vd1−vd2|=2.45
 P=150 nm As described above, according to Embodiments 1 to 3, the resin layer having the minute periodic structure with the pitch smaller than the wavelength of incident light is provided on the lens surface to allow the stable and excellent reflection suppressing effect resistant to changes in environmental characteristics such as temperature and humidity.

Especially, the present invention can be effectively used when the resin layer has a large variation in thickness as in the replica aspherical surface or when the aspherical surface has a smaller radius of curvature, so that the flexibility can be increased in design of an optical system using an aspherical surface. Thus, the present invention is effective in reducing the size and increasing the performance of the optical system.

In addition, the minute periodic structure can be formed trough molding simultaneously with the replica aspherical surface to effectively achieve a reduction in cost.

The minute periodic structure can be formed to be periodic two-dimensionally to provide the reflection suppressing effect with small transmission variations in a vibration direction of light.

Since the aforementioned condition (4) is satisfied, distortion aberration or the like in the aspherical surface can be effectively corrected over a wide range of field angles, and the minute grating structure can be easily formed with the replica method.

When the minute grating structure is formed such that the structural parameters are continuously or gradually changed from the center toward the periphery of the lens, the optimal reflection suppressing effect can be provided even when the light incident angle varies irregularly.

Since the conditions (5) and (6) are satisfied, spherical aberration and chromatic aberration of the optical system can be effectively corrected in the curvature at the cemented surface between the replica resin layer and the base material, and the surface reflection at the interface between the replica resin layer and the base material can be reduced. In addition, the correction effects of axial chromatic aberration and chromatic aberration of magnification can be achieved at the cemented surface between the replica resin layer and the base material, and spherical aberration for color produced in the aspheric optical element can be reduced.

Since the condition (7) is satisfied, the grating shape is easily manufactured and occurrence of flare components can be reduced.

While each of Embodiments 1 to 3 has been described for the case where the minute periodic structure is provided for the replica aspheric lens (the optical element) for in the image-taking optical system of a camera, the present invention is applicable to a minute periodic structure provided for a replica aspheric lens used in a projection optical system of an image projection apparatus such as a liquid crystal projector or other optical systems.

Figure 9:
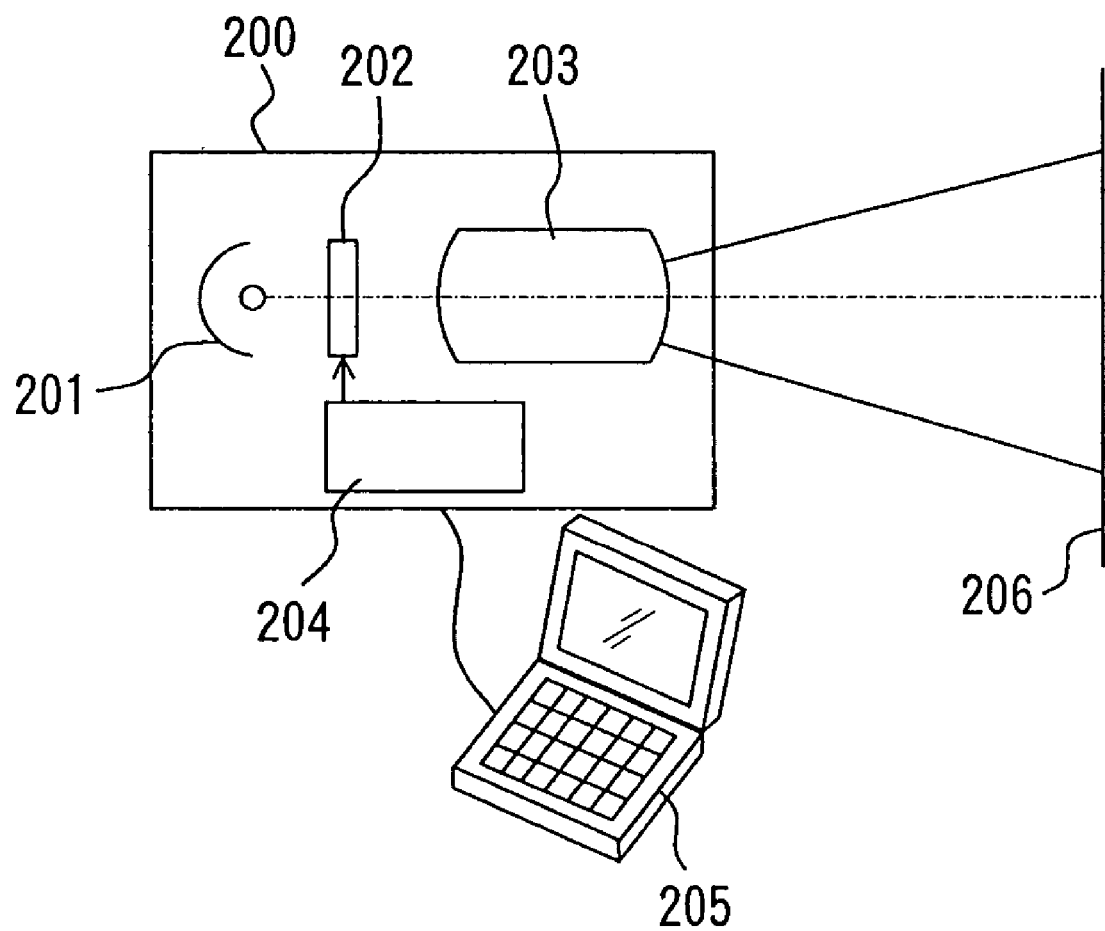
FIG. 9 shows the structure of an image projection apparatus to which the present invention is applicable.

FIG. 9 shows the structure of an image projection apparatus. In FIG. 9, reference numeral 200 shows a projector body, and 201 a white light source lamp. Reference numeral 202 shows an image forming device such as a liquid crystal display panel. A drive circuit 204 is connected to the image forming device 202. The drive circuit 204 drives the image forming device 202 in response to image information input from an image information supply apparatus 205 such as a personal computer, a DVD player, a VCR, and a television tuner to form an original image on the image forming device 202.

Light from the light source lamp 201 is modulated by the image forming device 202 and projected onto a screen 206 through a projection optical system 203. Thus, an enlarged version of the original image formed on the image forming device 202 is displayed on the screen 206.

In addition, while each of Embodiments 1 to 3 has been described for the case where the minute periodic structure is provided for the aspheric lens, the present invention is applicable to a minute periodic structure provided for a spherical lens.

While preferred embodiments have been described, it is to be understood that modification and variation of the present invention may be made without departing from the scope of the following claims.

This application claims priority from Japanese Patent Application No. 2003-293150 filed on Aug. 13, 2003, which is hereby incorporated by reference herein.

What is claimed is:

1. An optical element comprising:
   a base member; and
   a resin layer which is formed on the base member and has a linear expansion coefficient different from a linear expansion coefficient of the base member,
   wherein the resin layer has a minute periodic structure which has a period smaller than a wavelength of incident light on the optical element,
   wherein the resin layer has an aspherical surface on which the minute periodic structure is formed, and
   wherein the following condition is satisfied:

$20° < \theta < 90°$, where, when R represents an approximate radius of curvature of the aspherical surface in the resin layer, $\theta$ represents an angle between effective maximum peripheral portions of the optical element, which is viewed from a center of the approximate radius of curvature R, and the approximate radius of curvature refers to a radius of curvature of a circle defined by a center of the aspherical surface and the effective maximum peripheral portions.

2. The optical element according to claim 1, wherein the base member is made of glass.

3. The optical element according to claim 1, wherein the base member has a spherical surface on which the resin layer is formed.

4. The optical element according to claim 1, wherein the resin layer is formed on the base member together with the minute periodic structure in a replica method.

5. The optical element according to claim 1, wherein the minute periodic structure is a two-dimensionally periodic structure.

6. The optical element according to claim 1, wherein the minute periodic structure has parameters of respective structure portions which are changed continuously or step by step from a center toward a periphery of the optical element.

7. The optical element according to claim 1, wherein at least one of the following conditions is satisfied:

$0.01 < |nd1 - nd2| < 0.5$ $0.5 < |vd1 - vd2| < 40$, where nd1 and nd2 represent refractive indexes of the resin layer and the base member for a d-line, respectively, and vd1 and vd2 represent Abbe numbers of the resin layer and the base material for the d-line, respectively.

8. The optical element according to claim 1, wherein the following condition is satisfied:

$100\ nm < P < 350\ nm$, where P represents the period of the minute periodic structure.

9. An optical system comprising the optical element according to claim 1.

10. An optical apparatus comprising an optical system which has the optical element according to claim 1.

* * * * *

UNITED STATES PATENT AND TRADEMARK OFFICE
CERTIFICATE OF CORRECTION

PATENT NO. : 7,023,630 B2
APPLICATION NO. : 10/913332
DATED : April 4, 2006
INVENTOR(S) : Hiroshi Saito It is certified that error appears in the above-identified patent and that said Letters Patent is hereby corrected as shown below:

COLUMN 6

Lines 32-38 should read:

--Replica Aspheric Lens 7

|    | radius of curvature | central thickness | nd       | vd    | effective diameter |
|----|---------------------|-------------------|----------|-------|--------------------|
| r1 | *aspherical surface | 0.05              | 1.524210 | 51.39 | 17.0               |
| r2 | -11.905             | 1.50              | 1.80400  | 46.58 | 17.1               |
| r3 | -119.861            |                   |          |       | 22.1--.            |

COLUMN 7

Lines 47-52 should read:

--Replica Asperic Lens 12

|    | radius of curvature | central thickness | nd      | vd    | effective diameter |
|----|---------------------|-------------------|---------|-------|--------------------|
| r1 | -3023.7             | 1.20              | 1.72000 | 50.22 | 26.1               |
| r2 | -21.524             | 0.05              | 1.51282 | 50.86 | 24.1               |
| r3 | *aspherical surface |                   |         |       | 24.1--.            |

COLUMN 8

Lines 43-49 should read:

--Replica Aspheric Lens 32

|    | radius of curvature | central thickness | nd      | vd    | effective diameter |
|----|---------------------|-------------------|---------|-------|--------------------|
| r1 | -447.52             | 1.40              | 1.71300 | 53.84 | 30.3               |
| r2 | -71.382             | 0.05              | 1.52421 | 51.39 | 29.9               |
| r3 | *aspherical surface |                   |         |       | 29.7--.            |

UNITED STATES PATENT AND TRADEMARK OFFICE
CERTIFICATE OF CORRECTION

PATENT NO. : 7,023,630 B2
APPLICATION NO. : 10/913332
DATED : April 4, 2006
INVENTOR(S) : Hiroshi Saito It is certified that error appears in the above-identified patent and that said Letters Patent is hereby corrected as shown below:

COLUMN 9

Line 11, "trough" should read --through--; and
Line 42, "for" should be deleted.

Signed and Sealed this

Twenty-first Day of November, 2006

JON W. DUDAS
*Director of the United States Patent and Trademark Office*